Patented Mar. 19, 1929.

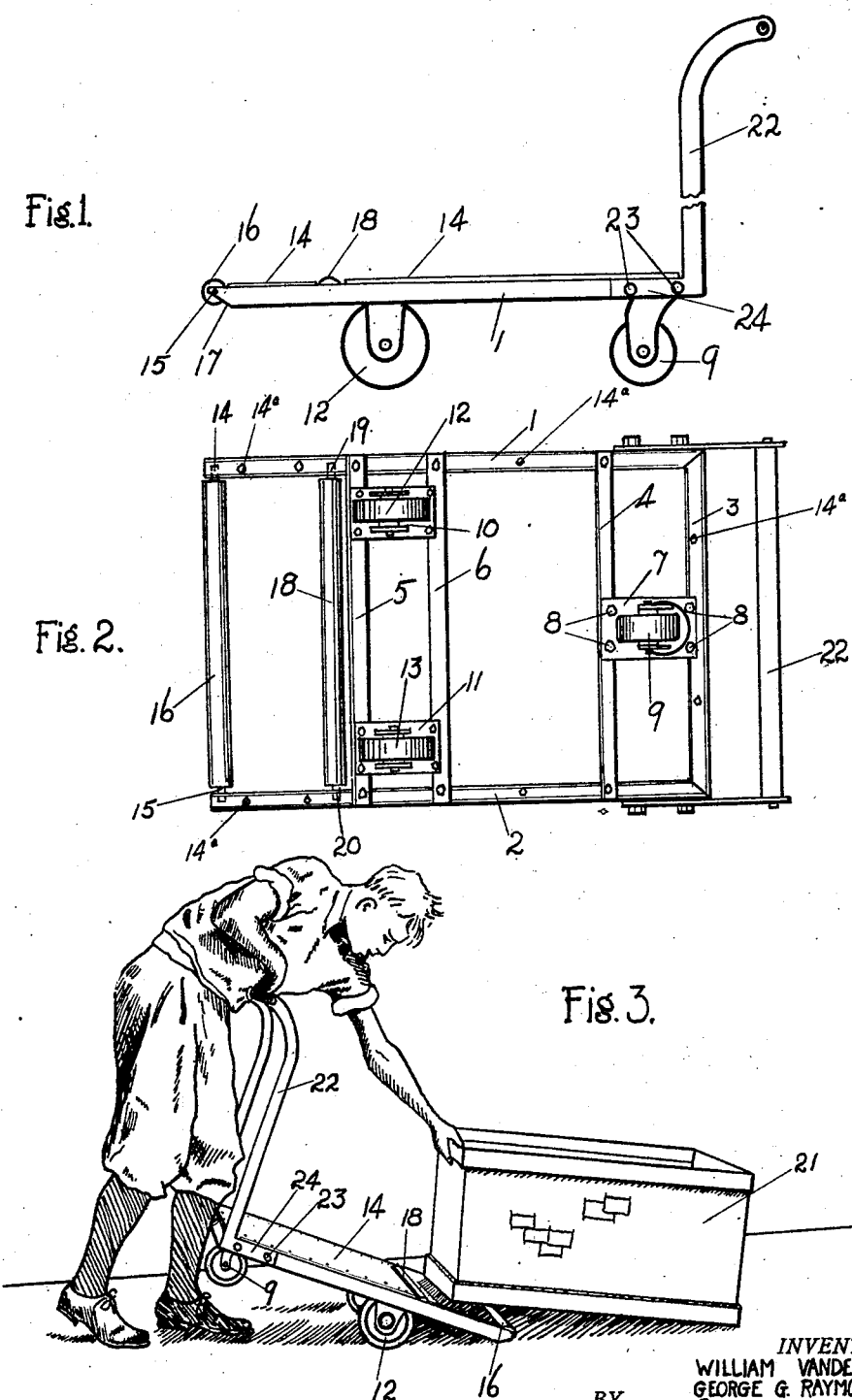

1,706,267

UNITED STATES PATENT OFFICE.

WILLIAM D. VAN DE MARK AND GEORGE G. RAYMOND, OF GREENE, NEW YORK, ASSIGNORS TO LYON IRON WORKS, OF GREENE, NEW YORK.

BASKET TRUCK.

Application filed March 8, 1926. Serial No. 93,145.

Our invention relates to trucks designed particularly for use in warehouses, mercantile establishments and other lines of business wherein there are boxes, baskets, packages, etc., to be transported from one place to another.

Our improved truck is particularly adaptable for the movement of commercial baskets of the type generally used in laundries and factories where articles are transported from one part of the room or building to another and are subject to frequent loading and unloading.

The principal object of our invention is to provide a small portable truck which is so constructed as to greatly facilitate the loading and unloading of the baskets, boxes or packages to be transported.

One important object lies in the provision of a truck having its rollers or wheels so positioned with respect to the platform that the truck may be tilted so as to place one end in close proximity to the floor or ground whereby a basket may be slid into position on the truck thereby obviating the necessity of lifting the same.

Another lies in the provision of an antifriction roller placed at the extreme end of the truck platform to facilitate the sliding of the basket or boxes from the floor on to the platform of the truck.

Another object is to provide a second antifriction roller projecting slightly above the surface of the platform and between the ends thereof to further facilitate the placing of the basket upon the truck.

Another object is to provide a truck of the character described which is simply constructed, easy to manufacture, sturdy in design, and which may be manipulated to load and unload the articles to be transported with the greatest ease.

Referring now to the accompanying drawing wherein like reference numerals indicate like parts:

Figure 1 is a side view of the truck.

Figure 2 is a bottom plan view thereof.

Figure 3 illustrates clearly the use and operation of the truck in placing a load thereon.

A frame is provided comprising two parallel side arms 1 and 2 connected at one end by the transverse member 3. These frame members may be of any suitable material such as strip or channel iron or steel and if desired the pieces 1, 2 and 3 may be integral with each other being formed from a single length of material and bent to the form shown in Figure 2.

Extending between the side arms 1 and 2 of the frame, and spaced inwardly a short distance from the member 3 is a brace member or strap 4 parallel with the member 3. This brace member preferably lies in the same plane as the member 3 and may be secured at its ends to the side bars 1 and 2 in any desired manner.

Adjacent the opposite end of the frame member but spaced inwardly therefrom a substantial distance, are two spaced parallel brace members 5 and 6 secured at their opposite ends to the side bars 1 and 2 and lying in the same plane with the brace member 4.

The members 4, 5 and 6 in addition to reinforcing the framework of the truck, provide convenient means for supporting the casters or wheels by which the truck is rendered mobile. To this end a supporting plate 7 is bolted or riveted or otherwise secured, as at 8, at one end to the end frame member 3 and at the opposite end to the brace member 4 and preferably positioned centrally of these two members. A caster 9 of conventional swivel type is carried by this plate 7 whereby the movements of the truck may be guided.

Adjacent the ends of the brace members 5 and 6, but lying within the sides 1 and 2 of the frame, are plates 10 and 11 similar to the plate 7. Casters 12 and 13, preferably of the non-swivel types, are mounted respectively upon the plates 10 and 11.

A platform 14 of sheet metal or other suitable material may be placed upon the framework for supporting the load to be carried. This platform may be secured in position in any suitable manner as by screws or rivets 14ª, and will of course be dependent for its support upon the particular construction of the frame members 1, 2 and 3. As clearly shown in Figure 2, the channel iron frame members receive this securing means through the upper flat surface of the member.

The extreme ends of the frame members 1 and 2 opposite the end 3, support the pintles 14 and 15 of an antifriction roller 16 so placed that the upper periphery of this roller lies in a plane slightly above the plane of the platform 14. The ends of the side bars 1 and 2 adjacent the antifriction roller 16 are bevelled as at 17 to permit this end of the truck when tilted downwardly to bring the roller 16 into close proximity with the floor but without touching the same.

Spaced inwardly from the roller 16 and lying adjacent the supporting cross piece 5 is another antifriction roller 18 having its pintles 19 and 20 rotatably supported in the sides 1 and 2. The periphery of this antifriction roller also lies in a plane above that of the platform 14. From the foregoing description, it will be obvious that when the truck is tilted in the manner shown in Figure 3, a basket 21 or other box or package to be carried on the truck may be easily pulled upon the platform with a minimum of effort due to the antifriction rollers 16 and 18 which greatly facilitate the sliding of the basket upon the truck. A suitable handle 22 is provided adjacent the end member 3 and is secured in position by means of bolts or rivets 23 passing through the angle portion 24 of the handle lying adjacent the ends of the side bars 1 and 2.

The spacing of the casters 12 and 13 inwardly from the end of the truck enables the truck to be readily tilted to the position shown in Figure 3 for loading or unloading, and with a proper positioning of these casters the truck may be balanced to permit a maximum ease of handling.

It will be obvious from the foregoing that our improved truck is adaptable to many and varied uses other than those herein mentioned and that changes in details of construction and relation of parts may be made without departing from the spirit and scope of the invention. We do not limit ourselves therefore to the exact form herein shown and described other than by the appended claim.

We claim:—

A truck comprising a horizontal frame portion including two side members, two wheels at the front end and spaced rearwardly from said end, a caster wheel at the rear of the frame, said frame being bevelled on its lower sides at the front end, platform sections located on said frame, a roller located between the front ends of the side frame members and extending above the platform, and a second roller located between the platform sections and in front of the wheels and extending above said platform sections.

WILLIAM D. VAN DE MARK.
GEORGE G. RAYMOND.